(12) United States Patent
Sasao et al.

(10) Patent No.: US 6,454,177 B1
(45) Date of Patent: Sep. 24, 2002

(54) AIR-CONDITIONING CONTROLLING SYSTEM

(75) Inventors: Keiji Sasao, Tsuchiura; Tadakatsu Nakajima, Chiyoda, both of (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/801,700

(22) Filed: Mar. 9, 2001

(30) Foreign Application Priority Data

Sep. 18, 2000 (JP) ........................................ 2000-286855

(51) Int. Cl.[7] .............................. H02J 1/00; G01M 1/38
(52) U.S. Cl. ......................... 236/46 R; 236/51; 236/94; 307/39; 700/277
(58) Field of Search ................................ 700/277, 291, 700/295; 307/39; 236/46 R, 51, 91 C, 94, 44 R (56) References Cited

U.S. PATENT DOCUMENTS

| | | | | |
|---|---|---|---|---|
| 4,314,454 A | * | 2/1982 | Kamejima et al. | 62/201 X |
| 4,897,798 A | * | 1/1990 | Cler | 236/46 R X |
| 5,927,598 A | * | 7/1999 | Broe | 307/39 X |
| 6,178,362 B1 | * | 1/2001 | Woolard et al. | 700/295 |
| 6,241,155 B1 | * | 6/2001 | Weng | 236/47 |

FOREIGN PATENT DOCUMENTS

| | | | | |
|---|---|---|---|---|
| JP | 06-159751 | * | 7/1994 | F24F/11/02 |
| JP | 10-292943 | * | 4/1998 | F24F/7/06 |

* cited by examiner

Primary Examiner—William Wayner
(74) Attorney, Agent, or Firm—Antonelli, Terry, Stout & Kraus, LLP (57) ABSTRACT

An air-conditioning operation management company provides control information concerning air-conditioning equipments to a plurality of semiconductor manufacturing factories. The air-conditioning operation management company stores a measured result of an outside-air condition measuring unit in a past outside-air condition record database and obtains forecasted maximum temperature information on-that day from a weather forecast providing system. An outside-air condition transition forecasting unit forecasts all, transition of the outside-air condition on that day on the basis of the forecasted maximum temperature information. Information stored in an air-conditioning thermal load database, an air-conditioning equipment characteristic database and a set-temperature-and-humidity-of-air-conditioning-equipment database are employed to provide an optimum operation method of the air-conditioning equipments to the semiconductor manufacturing factories. Further, a forecasted result of an outside-air condition transition, an analyzed result of an air-conditioning thermal load and an analyzed result of a controlling method are displayed in customer terminals.

11 Claims, 9 Drawing Sheets

AIR-CONDITIONING CONTROLLING SYSTEM

BACKGROUND OF THE INVENTION

The present invention relates to an air-conditioning controller system, and more particularly to an air-conditioning controlling system suitable for a semiconductor manufacturing factory.

In the factory in which semiconductor products such as memories and LSIs are manufactured, in order to improve the quality of the products, the products are manufactured within a clean room shielded from the outside environment. A high-performance filter is used in the clean room to remove floating dust in the air and the air-conditioning system realizes a suitable environment in temperature and humidity for manufacturing of the products.

When the clean room is air-conditioned, a large amount of electric power is required for the air-conditioning and generation of air stream. In order to save energy in the air-conditioning of the clean room, JP-A-10-292943 discloses that a condition of the outside air is measured to calculate a temperature of a cooling liquid required for operation of an outside air-conditioning unit and an inside air-conditioning unit on the basis of the measured result so that a refrigerator is operated at the calculated temperature. Further, in order to reduce the cost of the clean room facilities and save energy thereof, JP-A-6-159751 discloses that an outlet for blowing an air stream covering an apparatus is disposed opposite to the apparatus and inlets for sucking the air are disposed around the apparatus.

In the air-conditioning system in a semiconductor manufacturing factory, two kinds of air-conditioning loads including a cooling load varied depending on an amount of semiconductors to be manufactured and a cooling load varied depending on a condition of the outside air are generated. Accordingly, only when the condition of the outside air is measured to control the air-conditioning or only when the air-conditioning is controlled in accordance with the amount of semiconductors to be manufactured, only one load is considered and accordingly the estimation of the cooling loads is not sufficient.

In the above JP-A-10-292943, since the air-conditioning is controlled in accordance with the condition of the outside air, the energy can be saved to some extent but some equipment cannot be turned on and off frequently and it is insufficient to predict operation of such equipment. Further, in JP-A-6-159751, the stream of air in the clean room is improved but it is not considered that the condition of the outside air is predicted to save energy. In addition, both of the above publications do not consider that electric energy is utilized effectively to reduce the discrepancy between a power generation plan of a power generation company and an amount of actually used electric power.

SUMMARY OF THE INVENTION

Accordingly, it is an object of the present invention to save energy in an air-conditioning system used in a factory in which a large amount of energy is used such as, for example, a semiconductor manufacturing factory. Further, it is an object of the present invention to save energy in an energy supply company that supplies energy to such a factory.

In order to achieve the above objects, according to the present invention, in an air-conditioning controlling system for providing a controlling method of an air-conditioning equipment including a number of control components to a factory or company provided with the air conditioning equipment from an operation management company, air-conditioning thermal loads in the factory or company are classified into loads depending on an outside-air condition and loads based on a product plan and the operation management company provides the method of controlling the components constituting the air-conditioning equipment with the loads depending on the outside-air condition on the basis of a forecasted outside-air condition on that day calculated from past outside-air condition records on and before the previous data at least and of controlling the components constituting the air-conditioning equipment with the loads based on the product plan in substantially the same condition as on the previous day, to the factory or company.

Further, it is preferable that the operation management company includes a past outside-air condition record database in which past records of outside-air conditions on and before the previous day are stored and an air-conditioning thermal load database and predicts loads depending on outside-air conditions on that day on basis of a forecasted maximum temperature on that day obtained from weather forecast providing means through a network, past outside-air condition record data and load data on and before the previous day.

The operation management company may sequentially corrects a coefficient in a temporal variation term of a forecast equation for outside-air temperature and humidity on the basis of a time change rate of a measured value of an outside-air temperature on that day when a difference between the time change rate of the measured value of the outside-air temperature on that day and a time change rate of a transition value of a forecasted outside-air temperature is larger than a predetermined permissible value.

In order to achieve the above objects, according to another aspect of the present invention, in an air-conditioning controlling system in a semiconductor manufacturing factory connected to an operation management company through a network, the operation management company includes forecast means for forecasting a transition of an outside-air condition on that day, air-conditioning thermal load predicting means for predicting an air-conditioning thermal load, means for analyzing an air-conditioning controlling method, means for collecting and adding amounts of energy used, and a first local network for connecting the above-mentioned means and the semiconductor manufacturing factory includes means for measuring an outside-air condition, customer terminals, means for measuring an amount of energy used, means for measuring temperature and pressure of air-conditioning equipments, a second local network for connecting the measuring means, and air-conditioning equipments for air-conditioning semiconductor manufacturing facilities. A past outside-air condition record database, an air-conditioning equipment characteristic database, a set-temperature-and-humidity-of-air-conditioning-equipment database and an air-conditioning thermal load database are connected to any of the first or second local network. Weather forecast providing means is connected to the first local network through the internet or a public network. Results measured by the outside-air condition measuring means are stored in the past outside-air condition record database. The outside-air condition transition forecasting means forecasts a transition in future of an outside-air condition on the basis of information stored in the past outside-air condition record database and information provided by the weather forecast providing means. Information of thermal loads generated in the semiconductor manufacturing facilities is stored in the air-conditioning thermal load database. The air-conditioning thermal load predicting means predicts a thermal load in future in the semiconductor manufacturing factory on the basis of information acquired from the outside-air condition transition forecasting means and the air-conditioning thermal load database through the first local network. Set values of temperature and humidity of the air-conditioning equipments are stored in the set-temperature-and-humidity-of-air-conditioning-equipment database. The air-conditioning controlling method analyzing means analyzes the controlling method of the air-conditioning equipments on the basis of information acquired from the air-conditioning thermal load predicting means, the air-conditioning equipment characteristic database and the set-temperature-and-humidity-of-air-conditioning-equipment database. The customer terminals display at least one of information acquired from the outside-air, condition transition forecasting means, the air-conditioning thermal load predicting means and the air-conditioning controlling method analyzing means through the internet or the public network. The outside-air condition measuring means, the past outside-air condition record database, the weather forecast providing means, the outside-air condition transition forecasting means, the air-conditioning thermal load database, the air-conditioning thermal load predicting means, the air-conditioning equipment characteristic database, the set-temperature-and-humidity-of-air-conditioning-equipment database, the air-conditioning controlling method analyzing means and the terminal units are connected through the internet or the public network.

Further, it is preferable that the semiconductor manufacturing factory includes controlling method storing means for storing an analyzed result of the air-conditioning controlling method analyzing means and controlling means for acquiring information stored in the controlling method storing means and preferably controls the air-conditioning equipment, and the controlling method storing means and the controlling means are connected to the second local network.

Moreover, it is preferable that the semiconductor manufacturing factory includes the past outside-air condition record database, the air-conditioning equipment characteristic database, and the set-temperature-and-humidity-of-air-conditioning-equipment database, and the databases are connected to the second local database. It is preferable that the operation management company is connected to the internet or the public network so that the management company can acquire information stored in the databases.

It is preferable that the semiconductor manufacturing factory includes the means for measuring an amount of energy used in the air-conditioning equipment, and the operation management company includes amount-of-energy-used collection and addition means for collecting and adding a measured result of the amount-of-energy-used measuring means. The amount-of-energy-used measuring means and the amount-of-energy-used collection and addition means are connected through the internet or the public network. An amount of energy used collected and added by the amount-of-energy-used collection and addition means can be displayed in the terminal unit.

When a difference between information forecasted by the outside-air condition transition forecasting means and information measured by the outside-air condition measuring means exceeds a predetermined permissible value, the outside-air condition transition forecasting means preferably corrects a forecasting method. Selectively inputting means capable of changing display contents in the terminal unit may be provided.

The semiconductor manufacturing factory may pay an amount of money obtained by multiplying a difference between an amount of energy used in the semiconductor manufacturing factory, previously obtained before implementation of the air-conditioning control and an amount of energy used upon the air-conditioning control, obtained by the amount-of-energy-used collection and addition means by a charge rate as an operation management charge to the operation management company. The semiconductor manufacturing factory may pay an amount of money corresponding to a value obtained by multiplication of a period that the air-conditioning is implemented, the number of air-conditioning equipments and a predetermined charge rate to the operation management company.

DETAILED DESCRIPTION OF THE EMBODIMENTS

Figure 1:
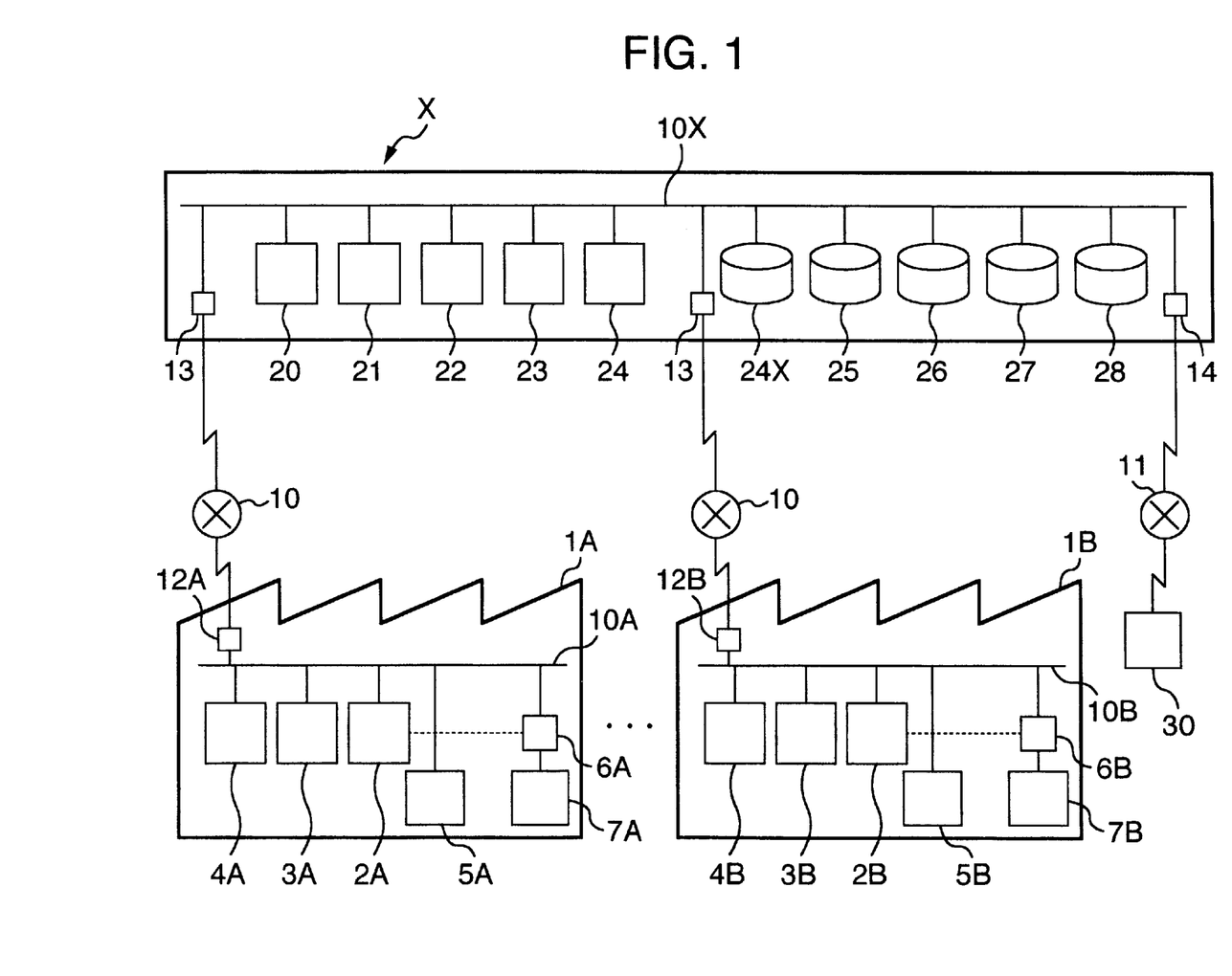
FIG. 1 is a block diagram schematically illustrating an embodiment of an air-conditioning controlling system according to the present invention.
Figure 2:
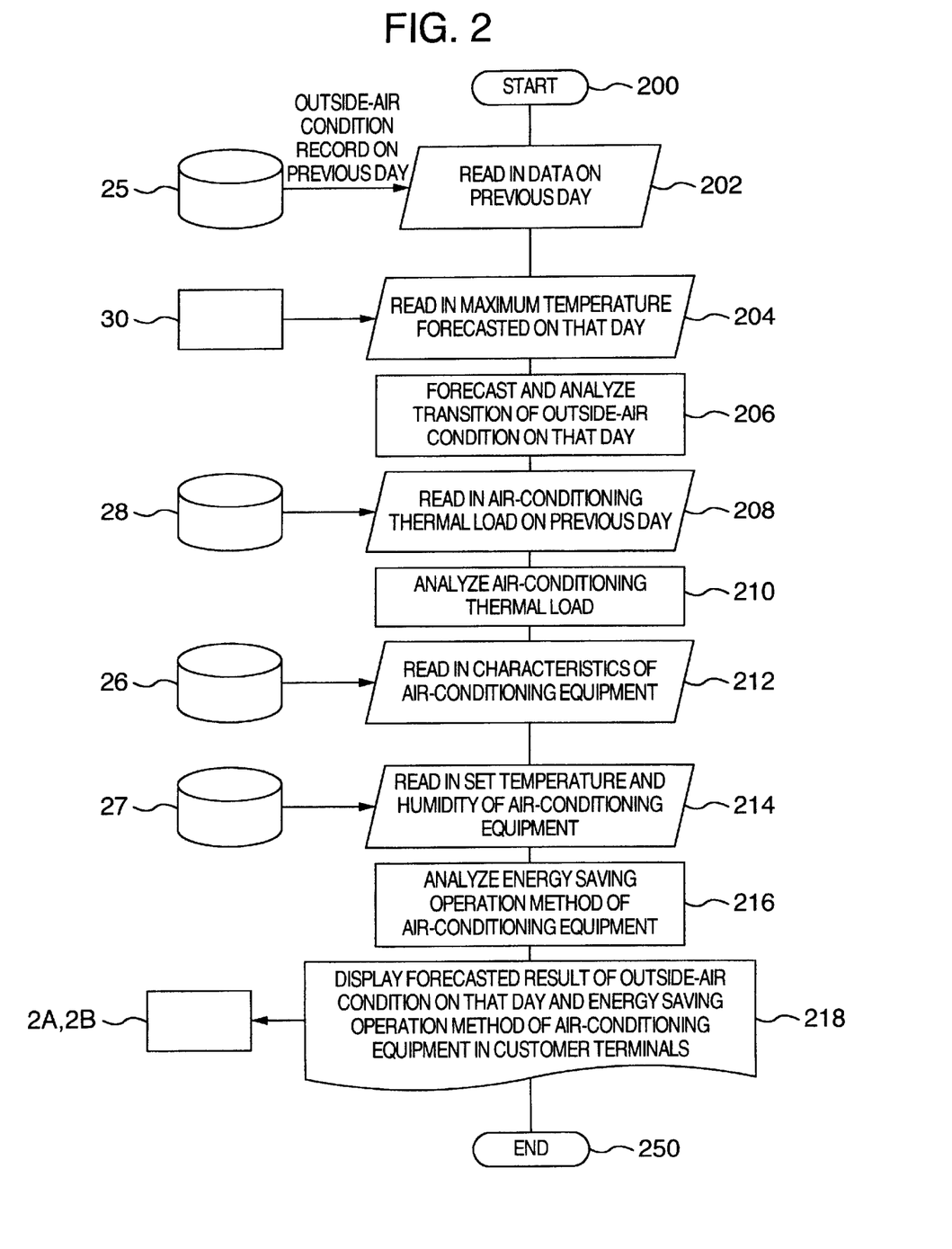
FIG. 2 is a flow chart showing air-conditioning control in the embodiment shown in FIG. 1.

Embodiments of the present invention are now described with reference to the accompanying drawings. FIG. 1 is a block diagram schematically illustrating an embodiment of an air-conditioning controlling system according to the present invention. FIG. 2 is a flow chart showing air-conditioning control in the embodiment shown in FIG. 1. The air-conditioning controlling system shown in the embodiment comprises a management company X for air-conditioning operation and a plurality of semiconductor manufacturing factories 1A, 1B . . . which are air-conditioned using electric power and information provided by the management company X.

The management company X is connected to the semiconductor manufacturing factories 1A, 1B, . . . through information transmission and reception sections 13 and a network 10 such as the internet, for example. The management company X is also connected to weather forecast providing section 30 through information transmission and reception section 14 and a network 11. The management company X includes a local network 10X, to which sections for predicting or analyzing air-conditioning loads, such as the information transmission and reception sections 13 and 14, section 21 for forecasting transition of a condition of the outside air, section 22 for predicting thermal loads of air-conditioning operation, section 23 for analyzing an air-conditioning controlling method and section 24 for collecting and adding amounts of energy used are connected. The sections 21 to 24 are controlled by a personal computer 20.

Further, connected to the local network 10X are a past outside-air condition record database 25 in which conditions of the outside-air are stored, an air-conditioning equipment characteristic database 26 in which information concerning air-conditioning equipments is stored, a set-temperature-and-humidity-of-air-conditioning-equipment database 27 in which set values for air-conditioning are stored, and an air-conditioning thermal load database 28 in which thermal loads of air-conditioning are stored.

On the other hand, the semiconductor manufacturing factories 1A, 1B . . . are also provided with local networks 10A, 10B . . . Information transmission and reception section 12A for transmitting and receiving information between the local network 10A and the network 10 is connected to the local network 10A. A customer terminal 2A used by a worker in the semiconductor manufacturing factory 1A, section 3A for measuring a condition of the outside air, section 4A for measuring an amount of energy used, section 5A for measuring temperature and pressure of an air-conditioning equipment, and an air-conditioning equipment 7A are connected to the local network 10A. Even in other semiconductor manufacturing factories 1B . . . , the same sections as described above are connected to the local network 10B . . . similarly.

Figure 10:
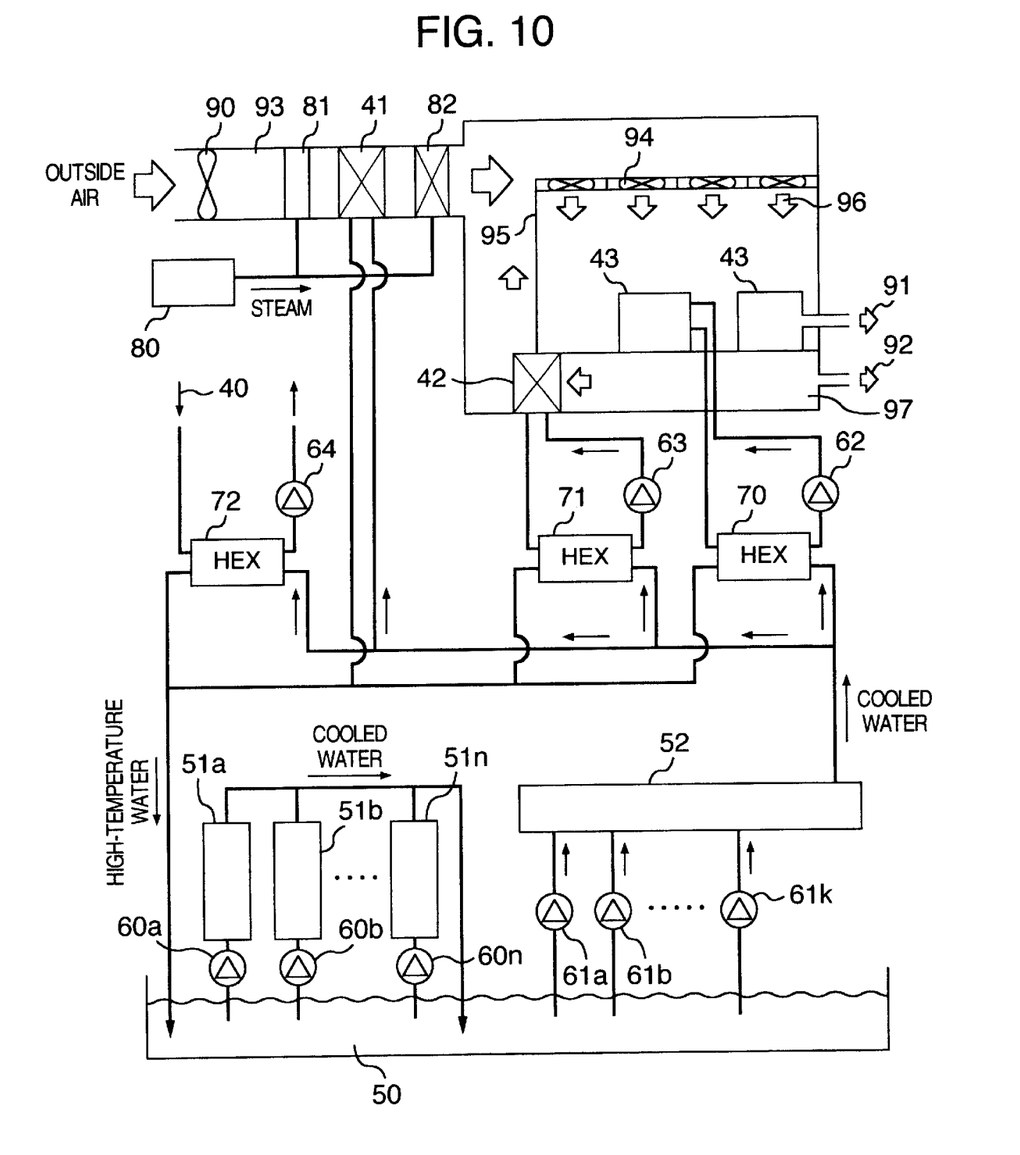
FIG. 10 is a block diagram schematically illustrating an embodiment of an air-conditioning equipment in semiconductor manufacturing facilities according to the present invention.

As an example of the semiconductor manufacturing factory included in the air-conditioning system thus structured, FIG. 10 illustrates a semiconductor manufacturing factory including a clean room. In FIG. 10, the air-conditioning equipment measuring section 5A and the air-conditioning equipment 7A are illustrated in detail. A duct 93 for introducing the outside air is attached to a clean room 95 disposed to cover a semiconductor manufacturing line. A blower 90, a humidifier 81, a cooling coil 41 and a heater 82 are disposed in the duct 93 in order of this description from the outside-air side. These elements are integrated to be accommodated in one casing and named an outside air-conditioning unit.

The clean outside air having a proper humidity and temperature led to the clean room 95 through the duct 93 flows down into the clean room as a substantially uniform down-flow 96 from a fan 94 disposed in an upper portion of the clean room. The down-flow 96 cools semiconductor manufacturing apparatuses 43 disposed in the clean room 95 and then flows into a space 97 formed under a floor from gaps of a grating formed in the floor of the clean room 95.

Part of the flow flowing into the space 97 under the floor is cooled by a dry-cooling coil 42 and becomes the down-flow 96 to the clean room 95 together, with the outside air again. The remaining flow of the down-flow 96 flowing into the space 97 under the floor is discharged to the outside from an outlet as high-temperature exhaust air 92. Harmful gas 91 generated by the semiconductor manufacturing apparatuses 43 is fed to a processing unit not shown from the outlet.

In order to keep the clean room 95 to a proper temperature and humidity environment, the clean room 95 is provided with an air-conditioning and humidity controller additionally. The humidifier 81 and the heater 82 disposed in the duct 93 for introducing the outside air into the clean room 95 are fed with high-temperature steam from a boiler 80. Further, in order to remove or radiate heat generated by the semiconductor manufacturing apparatuses 43, a circulation path in which circulating water flows is disposed within the semiconductor manufacturing apparatuses 43. A cooling water pump 62 and a heat exchanger 70 for exchanging heat generated by the semiconductor manufacturing apparatuses 43 with cooling water are disposed on the way of the circulation path.

In order to cool air heated by air-conditioning the inside of the clean room 95, the circulation path in which circulating water flows passes through the dry-cooling coil 42. A dry-coil type cooling water pump 63 and a dry-coil cooling water type heat exchanger 71 are disposed in the circulation path. The heat exchanger 71 heat-exchanges the circulating water passing through the dry-cooling coil 42 with cooling water described below.

Water stored in a cooling water pool 50 is fed to a plurality of refrigerators 51a, 51b, . . . , 51n by a plurality of primary cooling water pumps 60a, 60b, . . . , 60n, respectively, and returned to the cooling water pool 50 after cooled by the refrigerators 51a, 51b, . . . , 51n. The water cooled by the refrigerators 51a, 51b, . . . , 51n and stored in the cooling water pool 50 is pumped up by a plurality of secondary cooling water pumps 61a, 61b, . . . , 61k to a header 52 for feeding cooled water having fixed pressure to portions where the cooled water is used for cooling.

The cooled water fed to the header 52 takes heat of air heated by air-conditioning the clean room 95 and the semiconductor manufacturing apparatuses 43 from the water circulating in the semiconductor manufacturing apparatuses 43 and the dry-cooling coil 42, so that the cooled water is heated. Further, in order to cool pure water 40 used in the semiconductor manufacturing apparatuses 43 and the like, the cooled water is fed to a pure-cooling-water heat exchanger 72 from the header 52. The pure water cooled by heat exchange with the cooled water is sent by a pure water pump 64 to the portions where the pure water is used.

The cooled water cools the circulating water and the pure water in the heat exchangers 70, 71 and 72 to be heated to a high temperature and is returned to the cooling water pool 50. A return inlet to the cooling water pool 50 of the high-temperature water pumped up by the primary cooling water pumps is separated from an intake to the refrigerators of the water cooled by the refrigerators 51a, 51b, . . . , 51n so that the high-temperature water and the cooled water are not mixed.

In the embodiment thus structured, the cooled water fed to the cooling coil 41 is heat-exchanged with the outside air fed from the blower 90 in the cooling coil 41 to cool the outside air and remove humidity therefrom. When the temperature and the humidity of the outside air are lower than a prescribed value, it is not necessary to cool the outside air and remove humidity therefrom and accordingly supply of the cooling water to the cooling coil 41 is stopped. Further, when it is necessary to humidify and heat the outside air, steam generated by the boiler 80 is led to the humidifier 81 and the heater 82.

Moreover, when harmful gas is generated in the manufacturing process of the semiconductor manufacturing apparatuses 43, the generated harmful gas is discharged to the outside of the clean room, while the outside air equal in quantity to the discharged gas and the air heated by air-conditioning of the clean room and discharged to the outside is introduced from the outside air-conditioning unit. The reason why part of the air-conditioned air is discharged to the outside is that it is prevented to increase a load on the dry-cooling coil 42.

The cooled load source in the semiconductor manufacturing factory shown in FIG. 10 includes the semiconductor manufacturing apparatuses 43, the dry-cooling coil 42, the cooling coil 41 of the outside air-conditioning unit and the pure water 40. The heated load source includes the humidifier 81 and the heater 82. An amount of heat generated in the semiconductor manufacturing apparatuses 43 and an amount of heat generated in the heat exchange (heat exchanger duty) in the dry-cooling coil 42 among the cooled load generated from the cooled load source depend on an amount of manufactured semiconductor products, that is, the number of the semiconductor manufacturing apparatuses 43 and the rate of operation thereof. The amount of manufactured semiconductor products is based on a manufacture plan and is not related to the season.

On the contrary, the amount of heat generated in the heat exchange in the cooling coil 41 of the outside air-conditioning unit and the cooled load on the pure water 40 depend on the condition of the outside air. That is, when the temperature of the outside air and the humidity are high, the load to be cooled is increased and when the temperature and the humidity of the outside air are low, the load to be cooled is reduced. Accordingly, the load is varied greatly depending on the seasons and in a day. For the cooling coil 41, the load variation depending on the seasons and in a day is particularly remarkable.

In order to cope with the variation of the load as minutely as possible for the load varied depending on the temperature of the outside air, that is, the load varied depending on the seasons, a plurality of heat source apparatuses or heat conveying or transmission apparatuses such as the refrigerators 51, the primary cooling water pumps 60 and the secondary cooling water pumps 61 are disposed. The number of the apparatuses to be installed is set so that the ability thereof is not insufficient even for the maximum load when all of the apparatuses are operated.

The method of controlling the apparatuses such as the heat source apparatuses and the pumps in the embodiment shown in FIG. 10 is now described as compared with the prior art. In a conventional semiconductor manufacturing factory, a worker decides the number of apparatuses to be operated on that day on the basis of his past experience and operates or stops the apparatuses by hand at the commencement time in the morning. In this case, the number of apparatuses to be operated is decided large so that a margin is contained to some extent so as not to lack the amount of cooling and heating generated by the heat source apparatuses. The reason is that a failure of the air-conditioning system directly influences the yield in manufacturing of semiconductors and great economical damage is suffered.

In such an operation method, a large amount of cooling and heating is fed as compared with the load to be cooled. That is, since more heat source apparatuses such as the refrigerators and more heat conveying apparatuses such as the pumps than required for the load to be cooled are operated, energy is used vainly by an excessive amount. Further, since the heat source apparatuses are operated in the state of a small load factor when more heat source apparatuses are operated than required for the load to be cooled, the efficiency of the apparatuses is reduced and energy is used vainly even in this aspect.

Accordingly, in the embodiment, the air-conditioning load is controlled on the basis of information on the previous day to thereby save energy. More particularly, as illustrated in FIGS. 1 and 2, when the air-conditioner controlling service of the management company X for air-conditioning operation is started (step 200), the personal computer 20 reads in past record information such as temperature and absolute humidity on the previous day from the past outside-air condition record database 25 (step 202). Measured values of the conditions of the outside air on and before the previous day or information of the conditions of the outside air obtained by the weather forecast providing section 30 on and before the previous day are stored in the past outside-air condition record database 25.

Then, the personal computer 20 acquires the maximum temperature forecasted on that day from the weather forecast providing section 30 (step 204). The outside-air condition forecasting section 21 forecasts transition of the outside-air conditions on that day on the basis of the past record information of the condition of the outside air on the previous day and the forecasted maximum temperature on that day. In the two continuous days, a difference in the absolute humidity between the first day and the second day is small generally. Accordingly, when the transition of the absolute humidity of the outside air on that day is forecasted, the record of the absolute humidity of the outside air on the previous day, for example, is used as it is.

On the other hand, a difference in the temperature of the outside air between the first and second days is different depending on the day. However, the tendency of variation in temperature in a day, for example, a time that the maximum temperature is reached, has a small difference between the first and second days. Thus, an outside-air temperature record curve on the previous day is corrected to be shifted by a difference between the forecast maximum temperature on that day and the maximum temperature on the previous day. Consequently, the transition in temperature of the outside air on that day can be forecasted.

When the forecast of the transition of the outside-air condition (step 206) is ended, the personal computer 20 reads in the air-conditioning thermal load on the previous day from the air-conditioning thermal load database 28 (step 208) and the air-conditioning thermal load predicting section 22 predicts the air-conditioning thermal load on that day on the basis of the air-conditioning thermal load obtained and the forecasted result of the transition of the outside-air condition on that day (step 210).

When the air-conditioning thermal load is predicted, the prediction method described below is used. Records of thermal loads of the facilities to be air-conditioned are previously stored in the air-conditioning thermal load database 28. In the case of the embodiment shown in FIG. 10, the load to be cooled for the semiconductor-manufacturing apparatuses 43, the dry-cooling coil 42, the cooling coil 41 and the pure water 40 and the load to be heated for the humidifier 81 and the heater 82 are stored.

The thermal load information stored in the air-conditioning thermal load database 28 is classified into the information depending on the outside-air condition and the information independent of the outside-air condition. The cooling coil 41 and the pure water 40 are the air-conditioning thermal load sources depending on the outside-air condition as described above. The air-conditioning thermal load curve on the previous day for these air-conditioning thermal loads depending on the outside-air condition is corrected by a difference in the outside-air condition between the forecasted result of the transition on that day and the measured result on the previous day.

On the other hand, the semiconductor manufacturing apparatuses 43 and the dry-cooling coil 42 are the air-conditioning thermal load independent of the outside-air condition since the semiconductor manufacturing line is in operation the whole year and contents of the semiconductor manufacturing apparatuses are not changed. Accordingly, the air-conditioning thermal load thereof depends on an amount of semiconductors manufactured but the air-conditioning load on the semiconductor manufacturing apparatuses independent of the outside-air condition is regarded to be the same as the air-conditioning thermal load on the previous day in almost all days.

After the air-conditioning thermal load on that day has been analyzed, the personal computer 20 reads in the characteristics of the air-conditioning equipments such as partial load characteristic of the refrigerator from the air-conditioning equipment characteristic database 26 (step 212). Further, the personal computer reads in information such as a set temperature and humidity of the clean room from the set-temperature-and-humidity-of-air-conditioning-equipment database 27 (step 214). The air-conditioning controlling method analyzing section 23 analyzes an energy saving operation method so that an amount of energy used in the semiconductor manufacturing factory is minimized on the basis of the information and the set temperature and humidity of the air-conditioning equipments read in from the database and the predicted result of the air-conditioning thermal load on that day (step 216).

The operation management company X transmits the various information thus obtained, to the semiconductor manufacturing factories 1A, 1B, . . . which are customers from the information transmission and reception sections 13 through the internet 10. In the customers, the information is received by the information transmission and reception sections 12A, 12B, . . . and read in the customer terminals 2A, 2B, . . . to be displayed (step 218). Information including the forecasted result of transition in the outside-air condition on that day and the analyzed result of the method of controlling the air-conditioning equipment are displayed in the customer terminals 2A, 2B, . . . In the semiconductor manufacturing factories 1A, 1B, . . . , controller 6A, 6B, . . . for the air-conditioning equipments are directly controlled from the customer terminals 2A, 2B, . . . on the basis of the displayed information or valves are opened or closed by hand. The worker may operate the controllers 6A, 6B, . . . on the basis of the information displayed in the customer terminals. In this case, there is a merit that the controllers can be disposed near the air-conditioning equipments. Operation portions of the controllers 6A, 6B, . . . or the air-conditioning equipments 7A, 7B, . . . are operated to thereby complete daily operation of the air-conditioning equipments (step 250).

The amount-of-energy-used measurement sections 4A, 4B, measures amounts of energy used in the air-conditioning equipments 7A, 7B, . . . at intervals of predetermined time and transmit the measured results of the amounts of energy used to the amount-of-energy-used collection and addition section 24 through the information transmission and reception sections 12, 13 automatically or by hand. The amount-of-energy-used collection and addition section 24 stores the measured result in an amount-of-energy-used database 24X.

In the embodiment of FIG. 1, the outside-air condition transition forecasting section 21, the air-conditioning thermal load predicting section 22, the energy-saving-operation-method-of-air-conditioning equipment analyzing section 23 constituting the air-conditioning controlling method analyzing section, the amount-of-energy-used collection and addition section 24, the past outside-air temperature record database 25, the air-conditioning equipment characteristic database 26, and the set-temperature-and-humidity-of air-conditioning-equipment database 27 are all connected to the local network 10x owned by the operation management company X, although some or all of them may be connected to a public communication network directly. Further, the databases may be connected to the local network of the semiconductor manufacturing factories. In this case, the security of the customer information is apt to be kept.

Similarly, in the embodiment, the customer terminals 2A, 2B, . . . , the outside-air condition measuring sections 3A, 3B, . . . , the amount-of-energy-used measurement sections 4A, 4B, . . . , the air-conditioning equipment measuring sections 5A, 5B, . . . , and the air-conditioning equipments 7A, 7B, . . . are connected to the local networks 10A, 10B, . . . provided in the semiconductor manufacturing factories 1A, 1B, . . . , although some or all of them may be connected to the public communication network directly.

Figure 3:
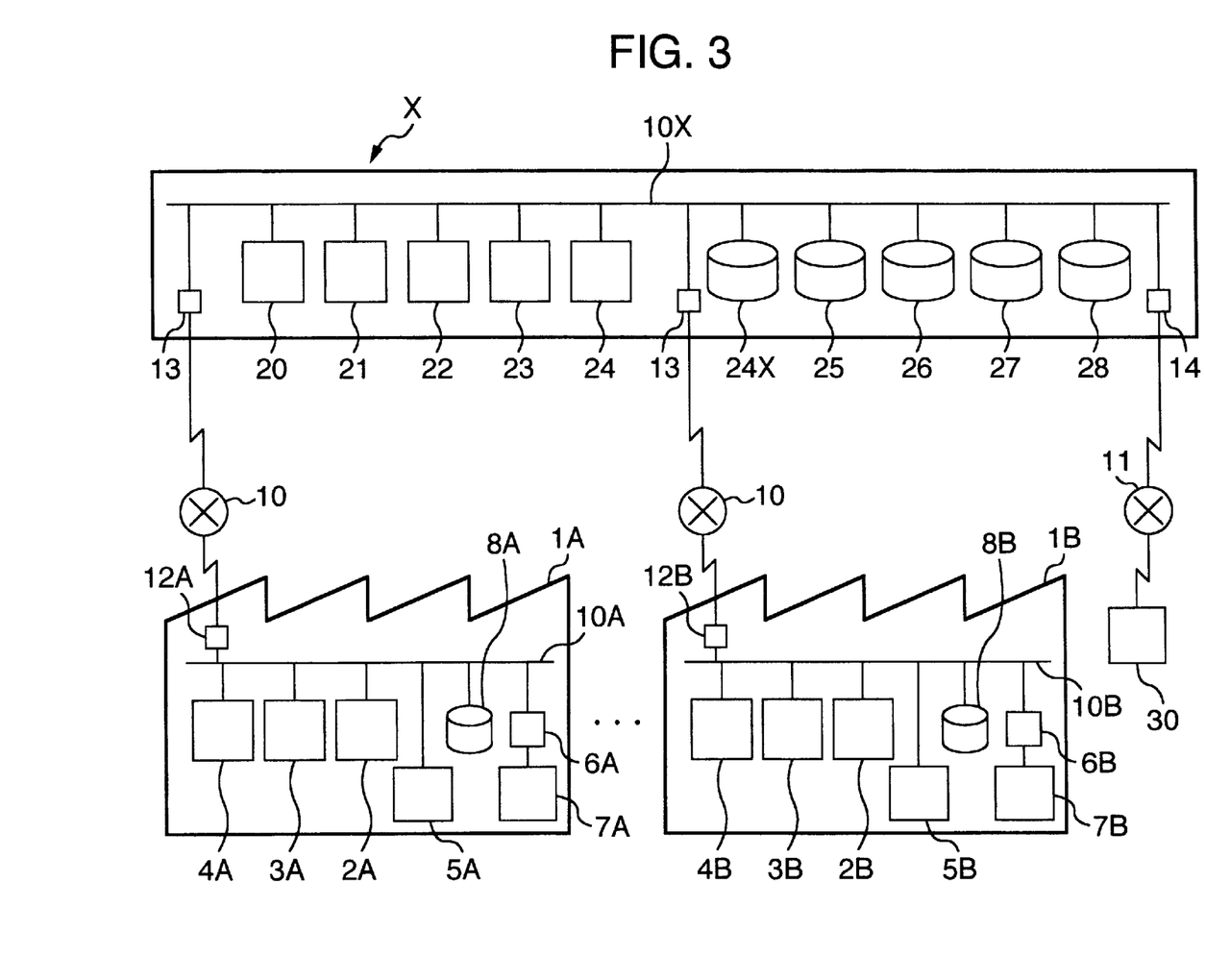
FIG. 3 is a block diagram schematically illustrating another embodiment of an air-conditioning controlling system according to the present invention.
Figure 4:
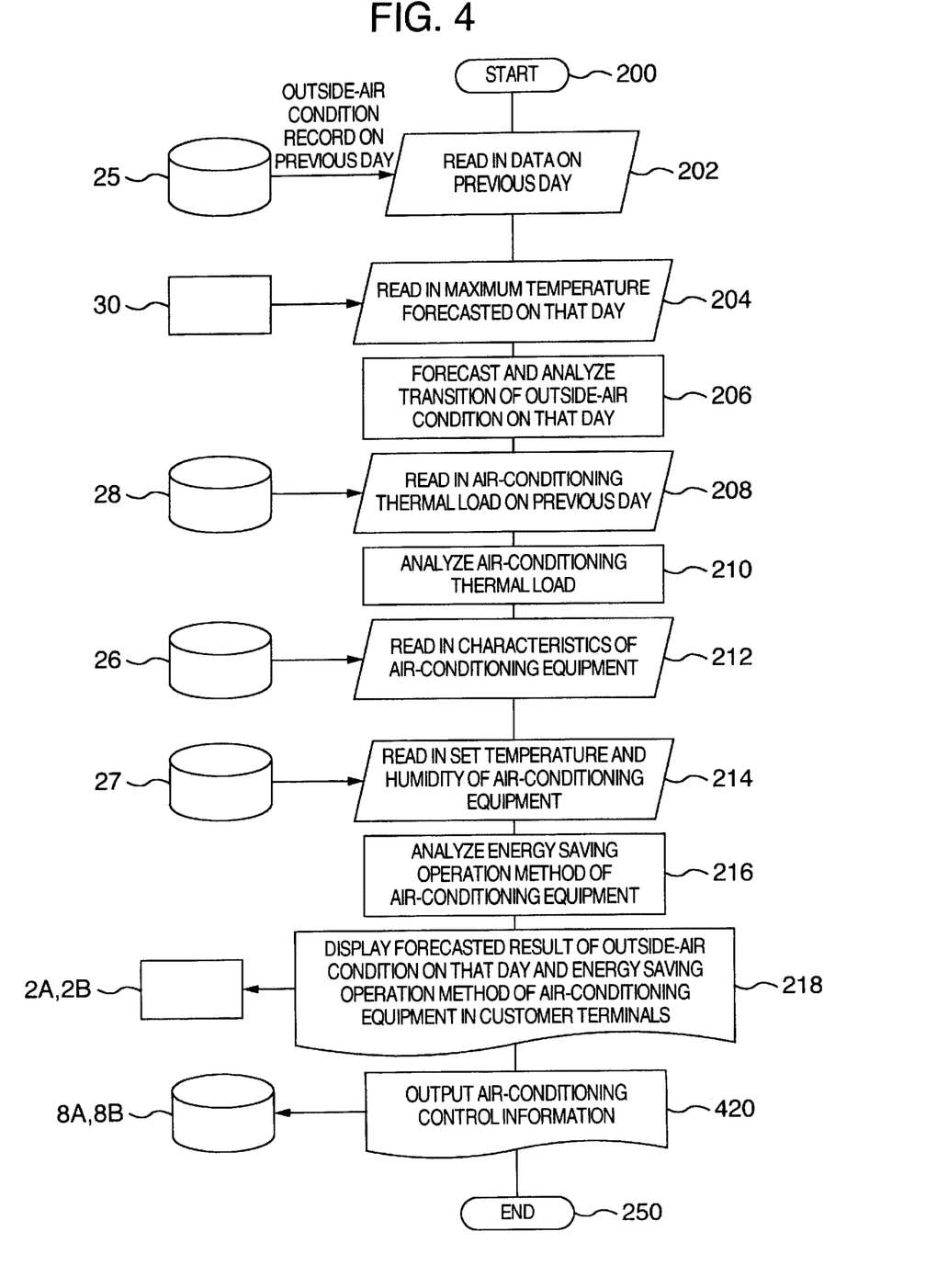
FIG. 4 is a flow chart showing air-conditioning control in the embodiment shown in FIG. 3.

FIGS. 3 and 4 illustrate another embodiment of the present invention. FIG. 3 is a block diagram illustrating the air-conditioning system. FIG. 4 is a flow chart showing processing contents of the embodiment illustrated in FIG. 3. The embodiment is different from the embodiment shown in FIG. 1 in that the semiconductor manufacturing factories 1A, 1B, . . . include air-conditioning equipment control databases 8A, 8B, . . . and controllers 6A, 6B, . . . connected to the local networks 10A, 10B, . . . The air-conditioning equipments 7A, 7B, . . . are connected to the controllers 6A, 6B, . . . , respectively. With this difference in the configuration, after the air-conditioning control information has been displayed in the customer terminal 2, the information can be outputted to the air-conditioning control databases 8A, 8B, . . . (step 420).

More particularly, the control method of the. air-conditioning equipments obtained by using the air-conditioning controlling method analyzing section 23 is stored in the air-conditioning control databases 8A, 8B, . . . in step 420. The controllers 6A, 6B, . . . obtain information of the air-conditioning equipment control databases 8A, 8B, . . . through the local networks 10A, 10B, . . .The air-conditioning equipments 7A, 7B, . . . are controlled on the basis of the obtained information. According to the embodiment, the operation that the worker controls the air-conditioning equipment manually or by using the customer terminal after the worker has confirmed display in the customer terminal can be omitted, so that operation of the air-conditioning system can be automated.

Further, operation records of the apparatuses constituting the air-conditioning system such as the refrigerators 51a, 51b, . . . , 51n and the secondary cooling water pumps 61a, 61b, . . . , 61k can be stored in the databases 8A, 8B, . . . and operation times of the apparatuses can be calculated so that the apparatuses can be operated on the average. With such measures, it can be prevented that operation is concentrated to only a particular equipment and the life of the equipments can be made to substantially the same. Consequently, the apparatuses can be maintained at substantially the same timing.

Further, the operation management company X can obtain charges for management based on operation times from the semiconductor manufacturing factories 1A, 1B, . . . This management charges are calculated by multiplying a charge rate by a difference between an amount of used energy previously obtained before implementation of the air-controlling control and an amount of used energy when the air-conditioning control described in the embodiment is performed. When it is difficult to calculate the operation time exactly, the number of days or control time that the control described in the embodiment is performed is multiplied by the number of controllers to thereby calculate the management charges in brief.

Figure 5:
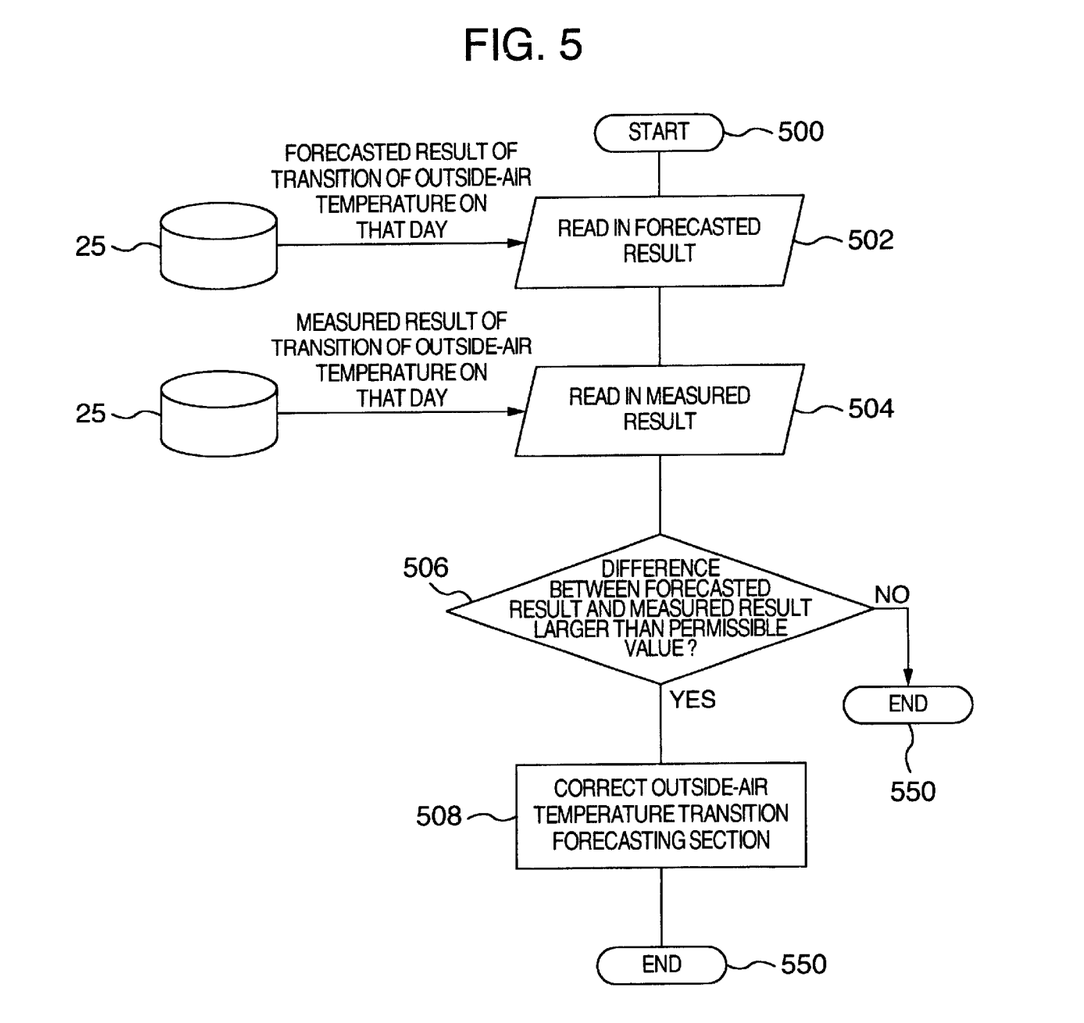
FIG. 5 is a flow chart showing a collection method of predicting section for predicting a transition of a condition of the outside air.

FIG. 5 shows a method of correcting the outside-air condition transition forecasting method of the outside-air condition transition forecasting section 21. When a correction program is executed (step 500), the outside-air condition transition forecasting section 21 reads in the forecasted result of the transition of the outside-air condition on that day from the past outside-air condition record database 25 (step 502). Then, the outside-air condition transition forecasting section reads in the measured result of the outside-air condition on that day from the same database 25 (step 504). A difference between the forecasted result and the measured result of the outside-air condition is compared with a previously set permissible value (step 506). When the difference is larger than the permissible value, the outside-air condition transition forecasting method of the outside-air condition transition forecasting section 21 is corrected automatically. Thus, the forecast accuracy for the air-conditioning thermal load in the air-conditioning thermal load predicting section 22 can be improved to provide the service having high reliability.

More particularly, the outside-air temperature on that day is measured and the temporal change rate thereof is calculated. A difference between the temporal change rate calculated from the measured outside-air temperature and the temporal change rate of the transition value of the outside-air temperature forecasted is calculated. When the difference exceeds a permissible value, a coefficient in a temporal variation term of the outside-air temperature and humidity in a forecast equation used to forecast the transition of the outside-air temperature is corrected so that the forecasted value on that day is equal to the measured value. Thereafter, the corrected coefficient is used to forecast the transition of the outside-air temperature.

Figure 6:
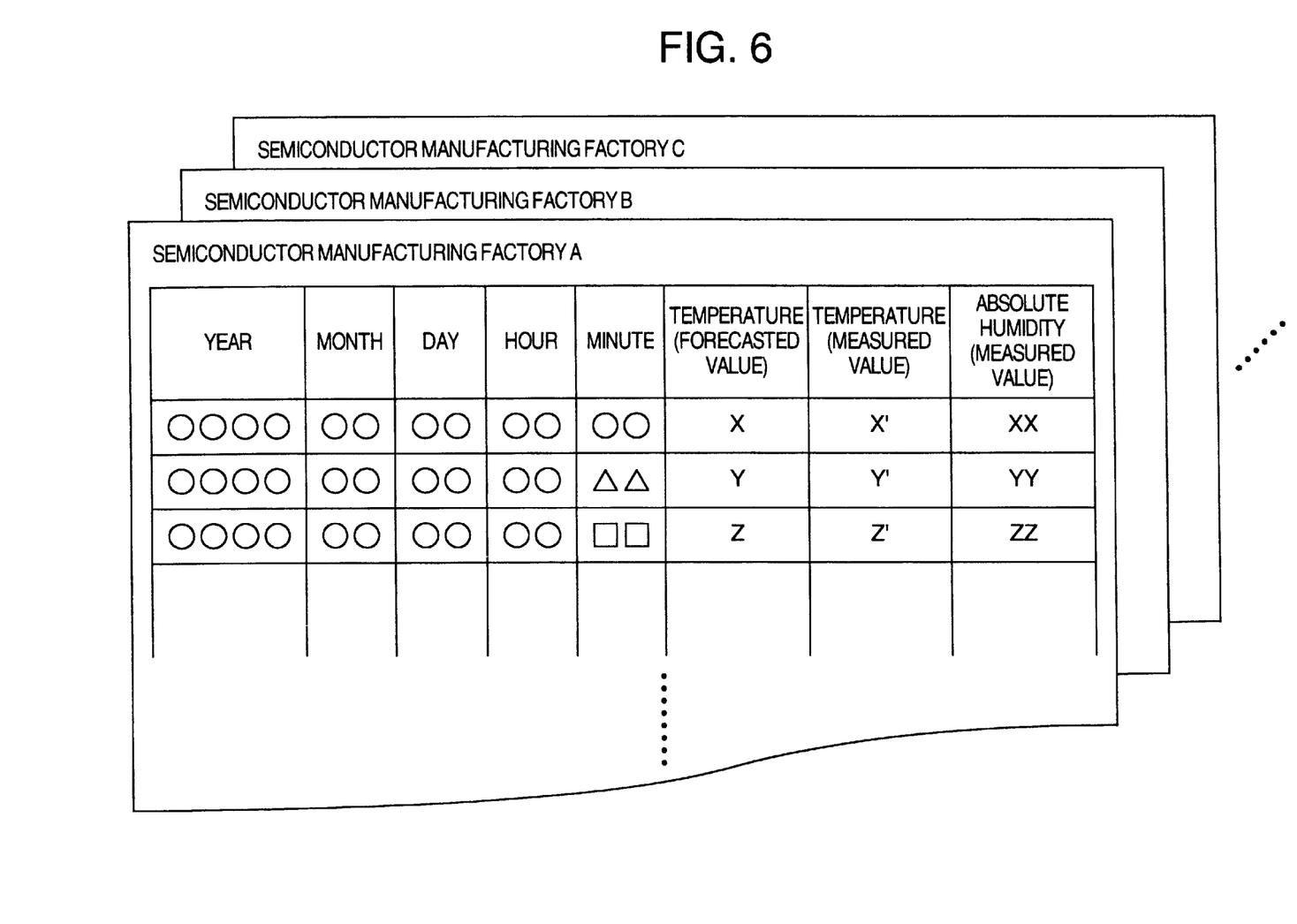
FIG. 6 shows an example of a format of a database for storing the condition of the outside air.

FIG. 6 shows an example of a data format of the past outside-air condition record database 25. A dedicated file for each of the semiconductor manufacturing factories is provided in the past outside-air condition record database 25. Date, time, forecasted result of outside-air temperature, measured results of outside-air temperature and absolute outside-air humidity and the like are stored in each file sequentially. The dedicated file is provided for each of the semiconductor manufacturing factories, so that information for each of the semiconductor manufacturing factories can be extracted promptly.

Figure 7:
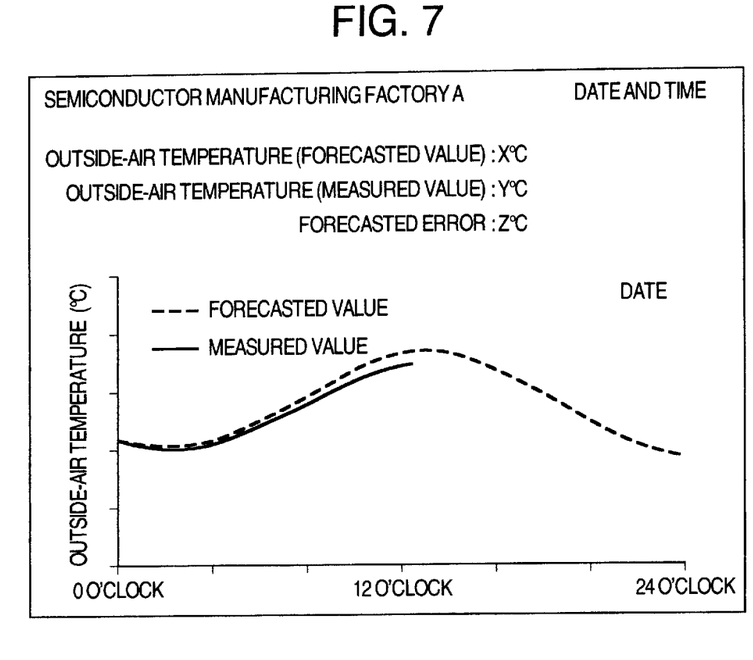
FIG. 7 shows a past outside-air condition record displayed in a computer terminal as an example.

FIG. 7 shows an example of an outside-air condition record displayed in the customer terminal. In FIG. 7, the forecasted result and the measured result of the outside-air temperature are displayed in each of the customer terminals 2A, 2B, . . . Further, a record in one day is displayed in a graph having the abscissa axis representing time and the ordinate axis representing temperature. In FIG. 7, an outside-air humidity record is not displayed, while it is needless to say that the outside-air humidity record can be displayed similarly.

Figure 8:
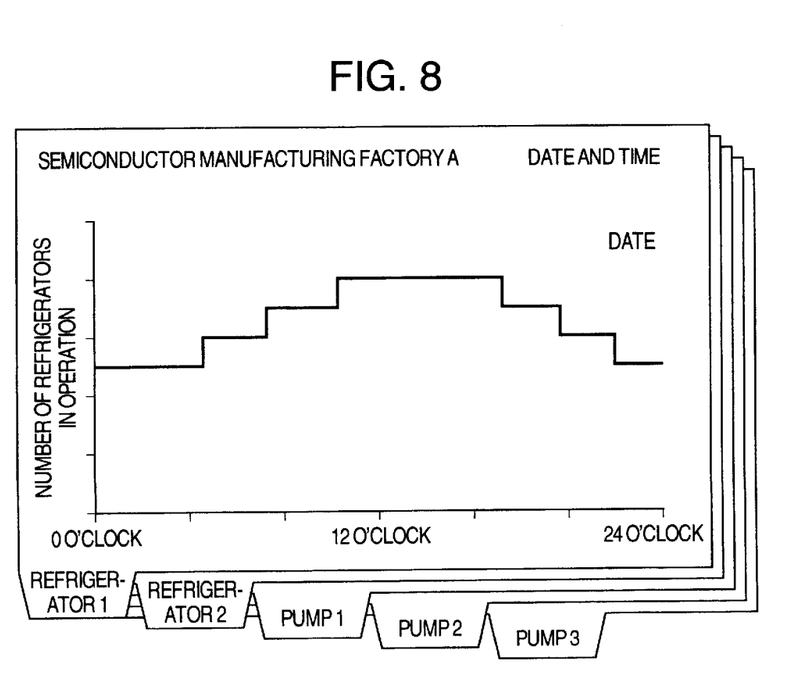
FIG. 8 shows an operation state of an air-conditioning equipment displayed in the computer terminal as an example.

FIG. 8 shows an example of the air-conditioning equipment controlling method displayed in. the customer terminal. In FIG. 8, the operation state. for each of the air-conditioning equipments constituting the air-conditioning system is displayed in each of the customer terminals 2A, 2B, . . . The operation state is displayed in a graph having the abscissa axis representing time and the ordinate axis representing the number of equipments in operation. Although the air-conditioning equipment includes a lot of apparatuses such as the refrigerators and the pumps, when a name of an apparatus is selectively inputted from a menu in each of the customer terminals 2A, 2B, . . . , information concerning a desired air-conditioning equipment is obtained. In FIG. 8, the number of refrigerators in operation of the same kind is displayed, while an operation condition of an apparatus itself, for example, an operation or stop state thereof may be displayed.

Figure 9:
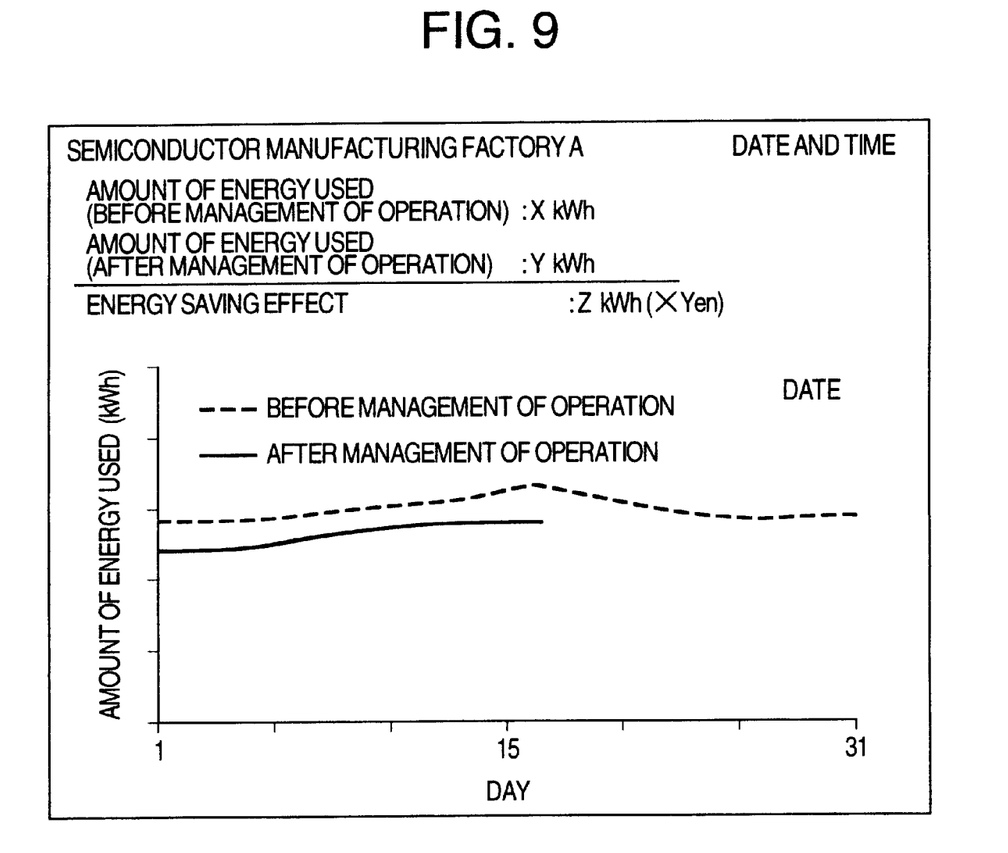
FIG. 9 shows a state of energy used in an air-conditioning equipment displayed in the computer terminal as an example.

FIG. 9 shows an example of a state of energy used in the air-conditioning equipment displayed in the customer terminal. An amount of used energy inputted previously to the amount-of-energy-used collection and addition section 24 before implementation of the service for providing the air-conditioning equipment controlling method and an amount of used energy measured by the amount-of-energy-used measurement sections 4A, 4B, . . . after the implementation of the service are displayed in each of the customer terminals 2A, 2B, . . . Further, the amounts are also displayed in a graph having the abscissa axis representing date and the ordinate axis representing an amount of energy used. In addition, a difference of the amounts of energy used between before and after the implementation of the service and an amount of money for energy corresponding to the difference are also displayed therein. Accordingly, the amount of energy used of the air-conditioning system and the saving effect of energy can be grasped easily.

The displayed contents shown in FIGS. 6 to 9 may be displayed in all of the customer terminals at the same time and only desired contents may be displayed in the customer terminal by selective inputting by the worker. Further, even in any of embodiments, since the air-conditioning thermal load is predicted, the energy supply company can predict the amount of energy to be supplied. Accordingly, the situation that an amount of electric power generated is lacking or excessive can be avoided in the business plan of the energy supply company, for example, when the power generation company makes an operation plan of the power generation apparatuses. Moreover, since the energy supply company can supply energy stably, the reliability is improved and the saving of energy is attained.

According to the present invention, since the air-conditioning thermal loads are classified into loads depending on the outside-air condition and loads varied on the basis of a product plan and each of them is predicted separately, the amount of energy to be supplied can be predicted. Accordingly, it can be avoided that energy is used vainly in the factory or company such as the semiconductor manufacturing factory which consumes a large amount of electric power.

What is claimed is:

1. An air-conditioning controlling system for providing a controlling method of an air-conditioning equipment including a number of control components to a factory or company provided with said air conditioning equipment from an operation management company, wherein air-conditioning loads in said factory or company are classified into loads depending on an outside-air condition and loads based on a product plan and said operation management company provides said control method of controlling said control components constituting said air-conditioning equipment with said loads depending on the outside-air condition on the basis of a forecasted outside-air condition on that day calculated from past outside-air condition records on and before the previous data at least and of controlling said control components constituting said air-conditioning equipment with said loads based on said product plan in substantially the same condition as on the previous day, to said factory or company.

2. An air-conditioning controlling system according to claim 1, wherein said operation management company includes a past outside-air condition record database in which past records of outside-air conditions on and before the previous day are stored and an air-conditioning thermal load database and predicts loads depending on outside-air conditions on that day on basis of a forecasted maximum temperature on that day obtained from weather forecast providing means through a network, past outside-air condition record data and load data on and before the previous day.

3. An air-conditioning controlling system according to claim 1, wherein said operation management company sequentially corrects a coefficient in a temporal variation term of a forecast equation for outside-air temperature and humidity on the basis of a time change rate of a measured value of an outside-air temperature on that day when a difference between the time change rate of the measured value of the outside-air temperature on that day and a time change rate of a transition value of a forecasted outside-air temperature is larger than a predetermined permissible value.

4. An air-conditioning controlling system in a semiconductor manufacturing factory connected to an operation management company through a network, wherein said operation management company includes forecast means for forecasting a transition of an outside-air condition on that day, air-conditioning thermal load predicting means for predicting an air-conditioning thermal load, means for analyzing an air-conditioning controlling method, means for collecting and adding amounts of energy used, and a first local network for connecting said above-mentioned means; and said semiconductor manufacturing factory includes means for measuring an outside-air condition, customer terminals, means for measuring an amount of energy used, means for measuring an operating state of air-conditioning equipments, a second local network for connecting said measuring means, and air-conditioning equipments for air-conditioning semiconductor manufacturing facilities;

a past outside-air condition record database, an air-conditioning equipment characteristic database, a set-temperature-and-humidity-of-air-conditioning-equipment database and an air-conditioning thermal load database being connected to any of said first or second local network;

weather forecast providing means being connected to said first local network through the internet or a public network;

results measured by said outside-air condition measuring means being stored in said past outside-air condition record database;

said outside-air condition transition forecasting means forecasting a transition in future of an outside-air condition on the basis of information stored in said past outside-air condition record database and information provided by said weather forecast providing means;

information of thermal loads generated in said semiconductor manufacturing facilities being stored in said air-conditioning thermal load database;

said air-conditioning thermal load predicting means predicting a thermal load in future in said semiconductor manufacturing factory on the basis of information acquired from said outside-air condition transition forecasting means and said air-conditioning thermal load database through said first local network;

set values of temperature and humidity of said air-conditioning equipments being stored in said set-temperature-and-humidity-of-air-conditioning-equipment database;

said air-conditioning controlling method analyzing means analyzing said controlling method of said air-conditioning equipments on the basis of information acquired from said air-conditioning thermal load predicting means, said air-conditioning equipment characteristic database and said set-temperature-and-humidity-of-air-conditioning-equipment database;

said customer terminals displaying at least one of information acquired from said outside-air condition transition forecasting means, said air-conditioning thermal load predicting means and said air-conditioning controlling method analyzing means through the internet or the public network;

said outside-air condition measuring means, said past outside-air condition record database, said weather forecast providing means, said outside-air condition forecasting means, said air-conditioning thermal load database, said air-conditioning thermal load predicting means, said air-conditioning equipment characteristic database, said set-temperature-and-humidity-of-air-conditioning-equipment database, said air-conditioning controlling method analyzing means and said terminal units being connected through the internet or the public network.

5. An air-conditioning controlling system according to claim 4, wherein said semiconductor manufacturing factory includes controlling method storing means for storing an analyzed result of said air-conditioning controlling method analyzing means and controlling means for acquiring information stored in said controlling method storing means and controlling said air-conditioning equipment, and said controlling method storing means and said controlling means are connected to said second local network.

6. An air-conditioning controlling system according to claim 4, wherein said semiconductor manufacturing factory includes said past outside-air condition record database, said air-conditioning equipment characteristic database, and said set-temperature-and-humidity-of-air-conditioning-equipment database, and said databases are connected to said second local database, said operation management company being connected to the internet or the public network so that said management company can acquire information stored in said databases.

7. An air-conditioning controlling system according to claim 4, wherein said semiconductor manufacturing factory includes said means for measuring an amount of energy used in said air-conditioning equipment, and said operation management company includes amount-of-energy-used collection and addition means for collecting and adding a measured result of said amount-of-energy-used measuring means, said amount-of-energy-used measuring means and said amount-of-energy-used collection and addition means being connected through the internet or the public network, an amount of energy used collected and added by said amount-of-energy-used collection and addition means being capable of being displayed in said terminal unit.

8. An air-conditioning controlling system according to claim 4, wherein when a difference between information forecasted by said outside-air condition transition forecasting means and information measured by said outside-air condition measuring means exceeds a predetermined permissible value, said outside-air condition transition forecasting means corrects a forecasting method.

9. An air-conditioning controlling system according to claim 4, comprising selectively inputting means capable of changing display contents in said terminal unit.

10. An air-conditioning controlling system according to claim 4, wherein said semiconductor manufacturing factory pays an amount of money obtained by multiplying a difference between an amount of energy used in said semiconductor manufacturing factory, previously obtained before implementation of the air-conditioning control and an amount of energy used upon the air-conditioning control, obtained by said amount-of-energy-used collection and addition means by a charge rate as an operation management charge to said operation management company.

11. An air-conditioning controlling system according to claim 4, wherein said semiconductor manufacturing factory pays an amount of money corresponding to a value obtained by multiplication of a period that the air-conditioning control is implemented, the number of air-conditioning equipments and a predetermined charge rate to said operation management company.

* * * * *